United States Patent Office 3,079,452
Patented Feb. 26, 1963

3,079,452
MANUFACTURE OF ELECTRICALLY-MELTED REFRACTORY PRODUCTS CONTAINING MINERAL OXIDES
Thérèse Grollier-Baron née Copin, Sorgues, and Jacques Gaudin, Avignon, France, assignors to L'Electro-Refractaire, Paris, France, a French company
No Drawing. Filed July 2, 1959, Ser. No. 824,465
Claims priority, application France July 7, 1958
6 Claims. (Cl. 13—34)

In the glass and iron industries, in order to produce linings for various apparatus, use is made of refractory products obtained by fusion of certain mineral oxides or mixtures of these oxides, such as silica, alumina, zirconia, chrome oxide, magnesia, alkaline oxides, etc., in an electric furnace and then casting the molten mass in moulds in which the mass solidifies in the final form of the product to be made.

In the course of manufacture or use of these refractory products, faults, sometimes quite serious are revealed. Thus in the glass industry it has been found that in numerous cases bubbles of gas form in the molten glass on contact of this glass with the refractory lining. In the iron industry these products have given rise to fragmentation or premature flaking, involving the putting out of action of the linings of the furnaces for which these products were used.

Up till now these faults have remained unexplained. The applicants have tried to remedy this and have found that the faults can be minimised or even avoided by carrying out the fusion of the mineral oxides in an electric furnace in accordance with a particular method of operation which forms the subject of the present invention.

Up to the present this fusion has been brought about by causing the electric furnace to operate by resistance heating, electrodes intruding into the charge, as this method seemed to be the most advantageous because of the very high temperature necessary for the fusion of very refractory oxides. However, applicants have found that this resistance procedure ought to be avoided because, although it may provide a compact product, this product gives rise to bubbles on contact with the glass or else cracks in metallurgical furnaces. Heating should take place under the effect of an arc striking above the bath, between the bath, and at least one electrode set apart from the molten product, the length of this arc being adapted so as to avoid reduction of the oxides in the charge by the carbon of the electrodes.

In fact, applicants noticed, as a result of numerous experiments, that the faults referred to coincided with a reduction of certain oxides and thought that this reduction might be due to carbon of the electrodes in the resistance heating method of operation or in working with a short arc.

In electrometallurgy it is known that the arcs between carbon electrodes have a marked reducing action when they are short, while when they are long the carbon given off by the electrodes is burnt in its course so that the reducing action becomes weaker, at least when the arc strikes in an oxidising atmosphere, as, for example, free air.

However, it could not be foreseen that the particular faults of bubbling and cracking encountered with refractory products based on mineral oxides were due to a reducing action, particularly that of carbon, because in the glass industry, for example, the phenomenon of bubbling can have many causes. The suppression or weakening of these defects by the use of a sufficiently long arc between the charge and an electrode or electrodes, so that the carbon given off by the electrodes might have time to burn before reaching the bath, is therefore a particular result unforeseen in the application of a long arc to the fusion of refractory products based on mineral oxides.

Applicants have also noticed that even if the external arc is suitable for lessening the fault of bubbling the product can still have the defect of a certain porosity.

It has been found that to combat this porosity it is advisable for the molten product to be subjected to stirring, i.e. agitation during the operation of fusion.

The process of preparation of refractory products which forms the subject of the present invention is accordingly characterised in that the fusion of a charge containing one or several refractory mineral oxides is effected in a furnace under the effect of heat liberated by an electric arc outside the charge and striking between the charge and at least one electrode set apart from the charge, the length of this arc being sufficient in order that its reducing action might be reduced to the minimum, the molten charge also being subjected to stirring.

The agitation can arise from the action of the arc itself, if that is suitably controlled.

In this way applicants have observed that with a short arc, such as is produced at the instant of striking of the arc following the moment when an electrode is moved away from the bath, the surface of the bath remains calm, whilst if one lengthens the arc by progressively increasing the distance of the electrode from the bath and if the intensity of the current is suitably adjusted there comes a moment when an intense agitation is visible at the surface of the bath. This agitation and the corresponding length of the arc often coincide, moreover, with the phenomenon of a "whistling" arc.

In addition, when there are several electrodes arranged in such a way that the current coming through one of them passes on to the bath by an arc, then goes through a certain part of the bath and comes back to the other electrode by a second arc, it can be advantageous, in order to obtain the appropriate length of arc for a given electric tension, to use small-diameter electrodes and to adjust the gap between the tips of the electrodes to the minimum point, below which an arc tends to strike directly between the electrodes without reaching the bath.

The stirring can also be achieved, by means other than the arc itself, particularly by causing a stream of gas to bubble through the bath, it being advisable to choose an oxidising one (air or oxygen, for example) or else by adding to the bath bodies liberating gas, and in particular sodium peroxide, or analogous substances, capable of liberating oxygen. Electromagnetic agitation could also be used.

Applicants have also found that the nature of the gaseous atmosphere in the fusion furnaces above the mass of molten matter plays an important part in the quality of the products obtained and that it is generally desirable to renew this atmosphere so that it remains oxidising, as is the case of air of normal composition.

Applicants have found, in fact, that if fusion is carried out in a confined atmosphere, as it is if a solid roof exists above the arc and the molten mass, the products obtained are not so good as those produced in contact with constantly renewed air. No doubt this arises from the fact that if the atmosphere of the furnace is confined it becomes charged with carbon monoxide resulting from the functioning of the arc between the carbon electrodes and the bath, this gas exercising a reducing effect on the oxides of the molten charge.

One of the features forming the subject of the present invention therefore consists of renewing the furnace atmosphere in contact with the molten mass, so as to eliminate from it the carbon monoxide and so maintain it in a neutral, or preferably in an oxidising condition. For this purpose the furnace can be provided with orifices or vents suitably arranged to permit the creation of a current of air in contact with the molten mass, either by the action of a suction fan in the furnace or by blowing it, such as with a natural draught. One of these orifices can be the tapping-hole of the furnace, in the region of the level of the charge, the other orifice or orifices being located at a suitable position so for ensuring the current of air.

This improvement can be used with advantage not only in the case of furnaces comprising in their upper part a solid and refractory roof, systematically designed so as to reduce loss of heat by radiation, but also in the case where a roof is created by natural action above the arc and the bath during fusion, in the form of a crust of materials driven off from the bath by the bubbling and agitation and more or less agglomerated together, by solidification.

Applicants have found that by observing the various conditions which have been mentioned, compact products are obtained which do not give rise to bubbles in the molten glass coming into contact with them and which also endure well in furnaces, particularly metallurgical furnaces.

It is to be noted that the addition of a body capable of ionising the atmosphere of the furnace and of a nature adapted to the composition of the molten product permits of increasing the stability and length of the arc and thus of reinforcing the effect of the process. This ionising body can be carbonate of soda added in the furnace for the purpose of fusion and supplying the whole or part of the sodium entering into the composition of the refractory product.

The invention is capable of successful application to mixtures of mineral oxides of various compositions.

The applicants have used it, in their own works, particularly for the preparation of refractory products containing zirconia and alumina in a total proportion exceeding 65%, the zirconia content varying from 0 to 90% and the silica content being lower than 30%.

For example, high quality products are obtained by melting and treating in an electric furnace, as has been said, charges containing:

| | Percent |
|---|---|
| $ZrO_2$ | 33 to 54 |
| $SiO_2$ | 13 to 2 |
| $Na_2O$ | 1.5 to 0.28 |
| $Al_2O_3$ | 50 to 36 |
| $Fe_2O_3+TiO_2$ | <1.5 |

The products obtained in accordance with the invention using these compositions are white or ivory yellow, while with the resistance heating procedure or with a short external arc they have a greyish colour.

Naturally, these examples are not the only ones, by any means.

The invention is, on the contrary, capable of very general application for all kinds of electrically-melted refractory products. In particular, products composed of pure alumina, or with the addition of a small quantity of alkaline oxides, or, again, dark coloured products with a basis of chromite, magnesia and alumina, can be cited.

Zircites artificially obtained by reducing zircon (natural silicate of zirconium) by carbon (see, in particular, C. Hine et al. pending application, Serial No. 793,699, filed February 17, 1959, for "Process of Preparation of Refractory Products Containing Zirconia, Alumina and Silica") are already known and the applicants have contributed, by research, to their development.

These zircites, of high zirconia content, can be specially used for manufacturing products having the numerical compositions indicated above. Although from the very fact of their method of preparation they can contain carbon and reduced products and, as a result, can be capable of giving rise to the phenomenon of bubbling referred to, it has been found that by applying the process forming the subject of the invention this harmful phenomenon can be eliminated owing to the combined action of an arc long enough not, of itself, to have a reducing effect, of a renewed oxidising atmosphere above the molten mass and of an agitation of this mass favourable to the reoxidation of the products in the course of fusion.

Samples extracted in the course of the process of fusion allow of the determination of the time for which this must be carried on so as to obtain the desired qualities of compactness and oxidation.

Applicants have also observed that the process, according to the invention, gives remarkable and entirely unexpected results in the diminution of a mechanical fault in refractory products based on mineral oxides melted in an electric furnace. These products used to show a very marked fragility at the edges and corners and, for this reason, were often delivered to users with corners broken and edges crumbling. Now, it has been found that putting the present process into operation permits of the elimination of this defect, which can doubtless be explained by the attainment of a much finer crystallisation of the solidified products.

This improvement has been very appreciable, particularly with products having the following composition:

| | |
|---|---|
| $ZrO_2$ | 33 to 36%. |
| $SiO_2$ | 16 to 18%. |
| $Na_2O$ | 1 to 1.8%. |
| $Al_2O_3$ | To make up to 100%, subject to impurities, such as Fe, Ti, CaO, MgO, the content of which should be reduced to the minimum. |

What we claim is:

1. In the art of preparing refractory and like products by fusion of a charge containing at least one mineral oxide in an electric arc furnace wherein an arc is caused to strike between an electrode positioned above a molten bath of said charge and said molten bath, a method comprising the concurrent steps of:
    operating in renewed oxidizing atmosphere above said molten bath in the path of said arc,
    positioning said electrode at such a distance above the surface of said molten bath that the path of said arc through said oxidizing atmosphere is long enough to insure substantially complete oxidation of any reducing agent traveling along said path before said agent reaches said bath, and
    subjecting said bath to agitation.
2. The method of claim 1, wherein the position of the electrode above the bath and the electric current supplied thereto are so adjusted that said arc operates as a "whistling" arc with a resulting agitation of the molten bath.

3. The method of claim 1, wherein the bath is agitated by bubbling therethrough an oxidising gas.

4. The method of claim 3, wherein the bath is agitated by oxygen evolving from an oxygen-generating substance added to the bath.

5. The method of claim 1, comprising the additional step of ionising the atmosphere above the bath by introducing thereinto an ionising substance.

6. The method of claim 5, wherein the ionising substance is sodium carbonate and is added towards the end of the melting operation.

References Cited in the file of this patent

UNITED STATES PATENTS

| | | |
|---|---|---|
| 1,332,422 | Boillot et al. | Mar. 2, 1920 |
| 1,347,838 | Bulley | July 7, 1920 |
| 2,271,366 | Field | Jan. 27, 1942 |
| 2,438,552 | Field | Mar. 30, 1948 |
| 2,593,505 | Wagstaff | Apr. 22, 1952 |
| 2,702,239 | Gilbert et al. | Feb. 15, 1955 |
| 2,903,376 | Sandmeyer | Sept. 8, 1959 |
| 2,919,994 | Steimke | Jan. 5, 1960 |

FOREIGN PATENTS

| | | |
|---|---|---|
| 797,339 | Great Britain | July 2, 1958 |